United States Patent [19]

Eckhold et al.

[11] Patent Number: 5,101,875
[45] Date of Patent: Apr. 7, 1992

[54] ROUTER BASE

[76] Inventors: Ben Eckhold, R.R. #2, Alconbury Rd.; Dale Greenhalgh, 212 W. Rohman; Michael D. Greenhalgh, 314 N. Davenport, all of Metamora, Ill. 61548

[21] Appl. No.: 649,491

[22] Filed: Feb. 1, 1991

[51] Int. Cl.⁵ ............................................. B27C 5/10
[52] U.S. Cl. ................................. 144/371; 144/134 D; 144/136 C; 409/182
[58] Field of Search .................... 409/175, 182; 144/134 D, 136 C, 371

[56] References Cited

U.S. PATENT DOCUMENTS

| | | | |
|---|---|---|---|
| D. 276,529 | 11/1984 | Campbell, Jr. | D15/122 |
| D. 305,896 | 2/1990 | Miyamoto | D15/127 |
| 2,452,818 | 11/1948 | Williams | 90/12 |
| 2,599,415 | 6/1952 | Russell | 90/12 |
| 2,732,671 | 1/1956 | McFadden | 51/170 |
| 3,241,453 | 3/1966 | Baldwin | 90/12 |
| 3,363,510 | 1/1968 | Burrows et al. | 90/12 |
| 3,438,412 | 4/1969 | Zeigler | 144/136 |
| 3,625,269 | 12/1971 | Holan | 144/136 R |
| 3,721,157 | 3/1973 | Bacher | 90/18 |
| 3,774,279 | 11/1973 | Hunter | 29/103 R |
| 3,811,361 | 5/1974 | Seely et al. | 90/12 D |
| 3,858,630 | 1/1975 | Cherry et al. | 144/144 |
| 3,893,372 | 7/1975 | Strakeljahn | 90/12 D |
| 3,943,985 | 3/1976 | Wowczyk | 144/134 A |
| 3,955,607 | 5/1976 | Roche | 144/134 D |
| 3,981,226 | 9/1976 | White | 90/12 D |
| 4,005,738 | 2/1977 | Strange et al. | 144/136 R |
| 4,044,805 | 8/1977 | Gronholz | 144/134 D |
| 4,112,986 | 9/1978 | Strange et al. | 144/323 |
| 4,156,990 | 6/1979 | Rutkowski | 51/170 PT |
| 4,248,282 | 2/1981 | Waldron et al. | 144/144 R |
| 4,263,947 | 4/1981 | Steiling | 144/2 R |
| 4,273,483 | 6/1981 | Mendicino | 409/178 |
| 4,279,554 | 7/1981 | Seidenfaden | 409/180 |
| 4,312,391 | 1/1982 | Snow | 144/1 F |
| 4,478,264 | 10/1984 | Miller et al. | 144/83 |
| 4,509,572 | 4/1985 | L'Archer | 144/84 |
| 4,593,735 | 6/1986 | Wirth, Jr. | 144/144 R |
| 4,630,657 | 12/1986 | Obradovich | 144/144.5 GT |
| 4,640,324 | 2/1987 | Lounds | 144/134 D |
| 4,648,763 | 3/1987 | Safranek | 409/234 |
| 4,674,548 | 6/1987 | Mills et al. | 144/134 D |
| 4,685,496 | 8/1987 | Livick | 144/134 D |
| 4,693,288 | 9/1987 | Buechele et al. | 144/87 |
| 4,696,331 | 9/1987 | Irland | 144/134 D |
| 4,741,370 | 5/1988 | Heaton | 144/134 A |
| 4,742,855 | 5/1988 | Hartley | 144/252 R |
| 4,770,216 | 9/1988 | Ruscak | 144/144 R |
| 4,787,127 | 11/1988 | Beall | 29/26 A |
| 4,792,266 | 12/1988 | Willis | 409/182 |
| 4,798,506 | 1/1989 | Kulp, Jr. | 409/179 |
| 4,809,755 | 3/1989 | Pontikas | 144/372 |
| 4,884,604 | 12/1989 | Rice et al. | 144/84 |

FOREIGN PATENT DOCUMENTS 2406498 10/1977 France .

*Primary Examiner*—W. Donald Bray
*Attorney, Agent, or Firm*—Heller & Kepler

[57] ABSTRACT

A router base and combination router and base for use as a guide in making a dado, rabbet groove, or similar cuts, has a plurality of peripheral edge segments spaced different distances from the center line of the router bit. The base provides for making one or more cuts of varying distances from a conventional fence without adjusting the fence.

14 Claims, 11 Drawing Sheets

ROUTER BASE

This invention relates to a router base and more particularly to a router base which attaches to a router in place of the original base or to the original base for use as a guide in making a dado, rabbet groove, or the like.

BACKGROUND OF THE INVENTION

A router, with the use of specific router bits, is often used to make dados, rabbets or grooves. The woodworker typically clamps a straight edge to the material into which the dado, rabbet or groove is to be cut or secures the material to be cut to a working surface having a straight edge. This straight edge, or fence, is used as a guide to enable the woodworker to make a straight cut at the desired location by running the base of the router along the fence. But often the dado, rabbet or groove must be wider than the width of the bit.

This requires the woodworker to move and reclamp the fence or material each time another pass or cut is made to increase the width of the dado, rabbet, groove or the like. This is repeated until the dado, rabbet or groove of the desired width is achieved.

Each time the woodworker moves the fence, the fence must be unclamped, repositioned, measured to ensure the proper cut is made, reclamped into position and remeasured to verify the position and to ensure the fence is still parallel to first cut. Often, the fence must be clamped and reclamped several times before it is properly positioned.

Each time the woodworker repositions the fence, there is a chance of error. If the fence is improperly located the resulting cut could make the dado, rabbet or groove either too wide, causing a waste of material; too narrow, causing the woodworker to reposition the fence to make another cut; or making a cut not parallel with the first cut, causing either wasted material or repositioning the fence to make another cut.

In addition to the possible errors, the process of repositioning the fence for repeated cuts is time consuming.

There are router guides available which attach to an existing router. But, these guides typically require repositioning the guide or readjusting the guiding surface each time a cut is to be made. These guides usually have an infinite number of settings within the specific range of finite adjustments. These types of guides, which require physical adjustment, are also subject to error and wasting time.

The widths of dados, rabbets or grooves usually corresponds to the widths of some standard size material. Thus, the guides which require an adjustment are usually overly complicated for the typical need. The widths usually correspond to the width of lumber, or other materials which fit into the rabbet, dado, groove or the like. For example, tongue and groove flooring typically has a standard size tongue and groove, and dimensioned lumber, which would fit into a dado or rabbet, has standard sizes, typically in one-eighth inch increments.

Thus, one of the objects of this invention to provide a router base which can be used as a guide, in conjunction with a fence, which is simple to use and which can be quickly and easily attached to the router in place of the original base or to the original base of a router without modifications.

Another object of this invention is to provide a router base which can be used as a guide and which allows the craftsman to make a dado, rabbet or groove wider than the width of the bit without repositioning the guide.

A further object of this invention is to provide a router base which can be used as a guide which enables the craftsman to make a number of cuts or passes of varying distances from the fence without readjusting the guide each time a cut is made.

Yet another object of this invention is to provide a router base which can be use as a guide in making dados, rabbets or grooves of fixed and standard sizes.

Still a further object of this invention is to provide a router base which can be used as a guide which enables the craftsman to make repeated cuts each exactly parallel to the first.

Yet a further object of the invention to provide a router base which can be used as a guide and which is economical to manufacture and sell so that it can readily purchased by the majority of craftsmen.

SUMMARY OF THE INVENTION

To achieve the foregoing and other objects of this invention there is provided a router guide which attaches to the base of a router for use in making a standard or fixed width dado, rabbet, groove or the like.

The router base consists of a disc shaped object divided into a number of segments with varying radii. The disc shaped object has a base which has a bottom surface, for contacting the surface of the material into which the dado, rabbet or groove is to be cut, and a top surface. In one embodiment, the top surface contains at least one recessed area or recession defining a router receiving pocket. The diameter of the recessed area corresponds to the size of the bottom of the router.

Mounting holes are provided in a typically standard pattern though the base for mounting the router base onto the router. These holes are countersunk into the bottom of the base to allow a smooth bottom surface to contact the material being worked. The router base attaches to the bottom of a router in place of the original base using the original mounting screws and threaded bores contained on the bottom of the router.

A center hole is contained on the router base through which the router bit extends when the base is mounted on the router.

In another embodiment, the router base contains no recession for receiving a router and it may not be provided with pre-drilled mounting holes. Rather it has a smooth top and bottom. These features provide a universal fit on virtually every make and model router available. Since the mounting holes are not pre-drilled, a centering guide is provided which is used to properly position the router base on the router to mark and custom drill the base to fit the router. The outer perimeter and segments are the same in either embodiment The outer perimeter of the router base consists of a number of segments. Each segment has a fixed radius from the center of the bit receiving center hole. The radii of each segment are sequential ranging in measurement from small to large. The measurement of the radii are typically one-eighth inch increments to correspond to standard sizes used by craftsmen.

In operation, once attached the craftsman runs the router base along the fence making a first cut. The first cut would typically be made using the segment with either the shortest or the longest radius. The outer circumference of the segment being in contact with the fence. The width of the dado, rabbet or groove can then be increased by making another pass with the router using the next segment with next larger or smaller radius. This can be related until the desired width is achieve.

DETAILED DESCRIPTION

Figure 1:
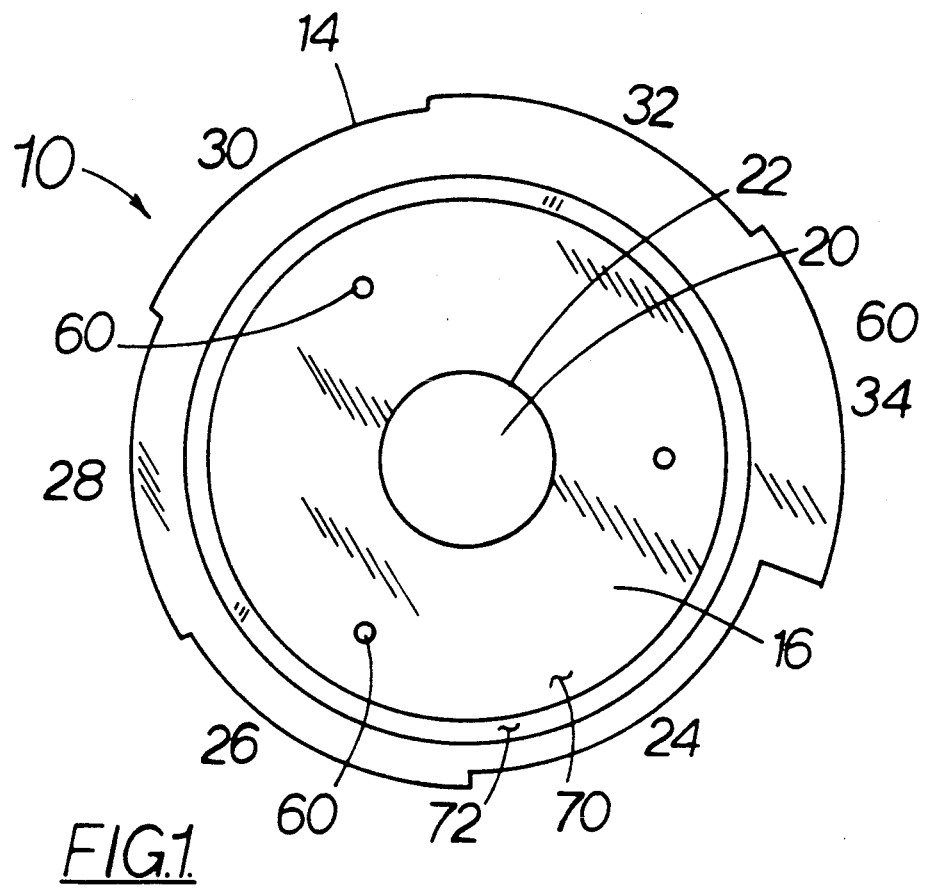
FIG. 1 is a top view of an embodiment of the present invention.
Figure 2:
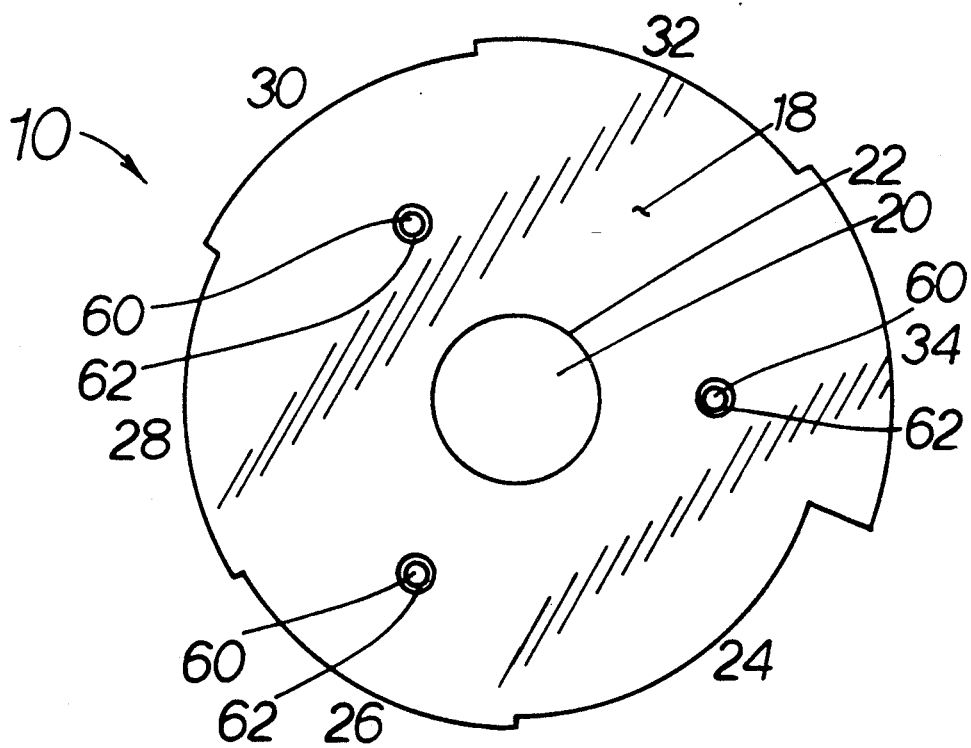
FIG. 2 is a bottom view of the embodiment.

Referring now to the drawings in general, there is provided a router base 10, which attaches to a router 36 as either an original acessory or in place of the original base. The router base 10 is for use as a guide in making dados, rabbets, grooves or the like of standard widths, which may be wider than the width of the router bit 38 being used.

Figure 10:
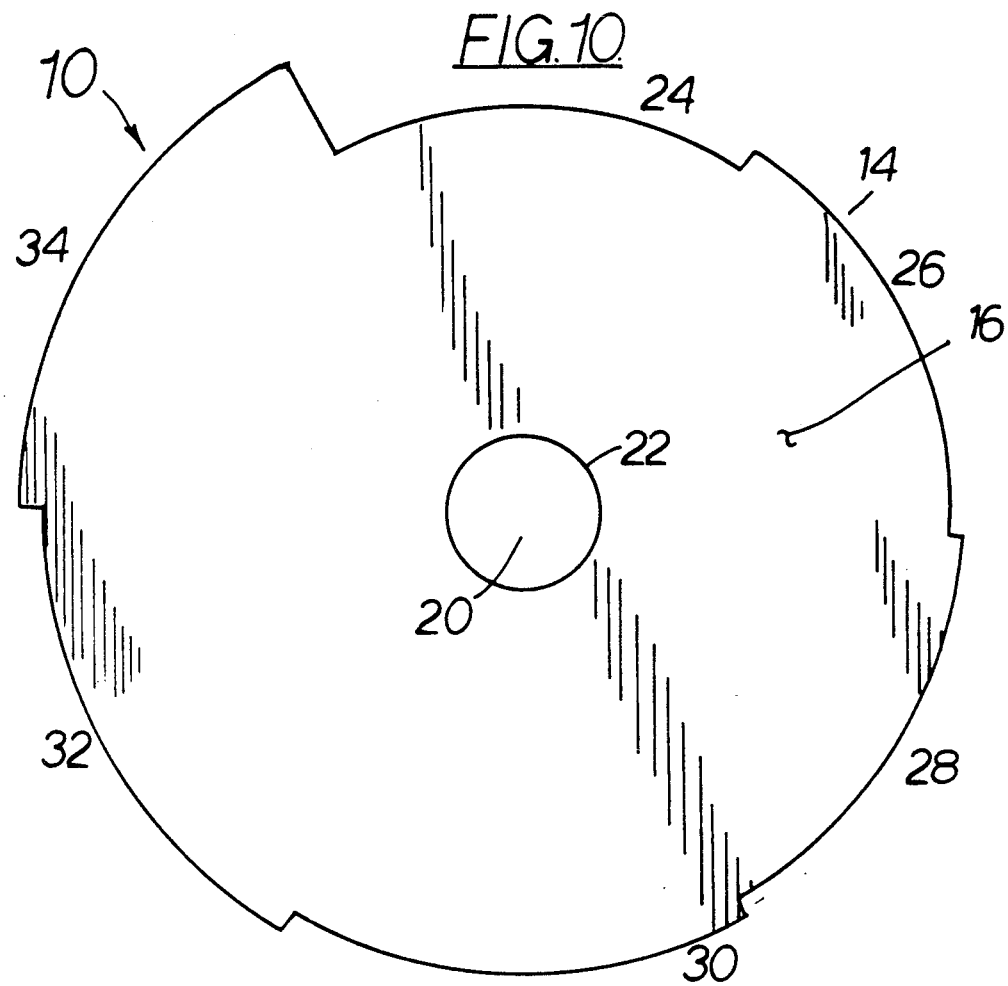
FIG. 10 is, a top view of another, universally adaptable embodiment of the router base.
Figure 12:
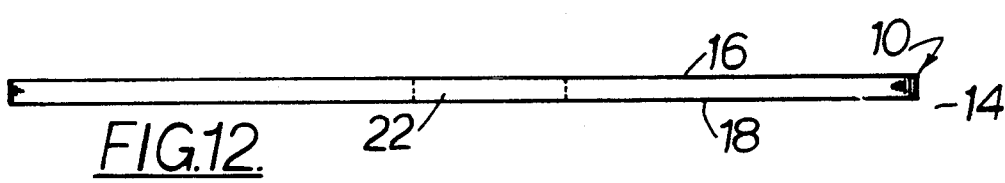
FIG. 12 is a side view of the embodiment.

Referring to FIG. 1 and 10 the router base 10 is generally disk shaped having an outer perimeter 14, top 16, bottom 18, center 20 and center opening 22. The base 10 is divided into a number of segments 24-34. Each segment 24-34 has a different and specific radius from the center 20 to the outer perimeter 14.

The segments 24-34 are arranged in consecutive order, the first segment 24 having the shortest radius. The segments 25-34 then increase in radius in a step like manner. This creates a somewhat sawtooth-shaped configuration on the outer perimeter 14. In the preferred embodiment, there are six segments.

In a preferred embodiment the first segment 24 has a radius of approximently 3.25 inches, the second segment 26 approximently 3.375 inches, third segment 28 approximently 3.5 inches, fourth segment 30 approximently 3.625, fifth segment 32 approximently 3.75 inches, and the sixth segment 34 approximently 3.875 inches.

The radius of each segment is measured from the center 20 of the router base 10. This center 20 corresponds to the exact center of the opening in the chuck 40 or router 36. The chuck 40 receives a router bit 38 which cuts the dado, rabbet, groove or the like. Thus, center 20 corresponds to the axial center line on which the router bit 38 rotates.

The router base 10 has a center opening 22 with center 20 being the center. Once the router base 10 is attached to a router the router bit extends through the center opening 22.

The router base 10 is attached to the router 36 by mounting screws 42. The mounting screws 42 are the original mounting screw used to hold the original base onto the router and use the original threaded bores 44 on the router 36 from which the original base was attached.

Figure 11:
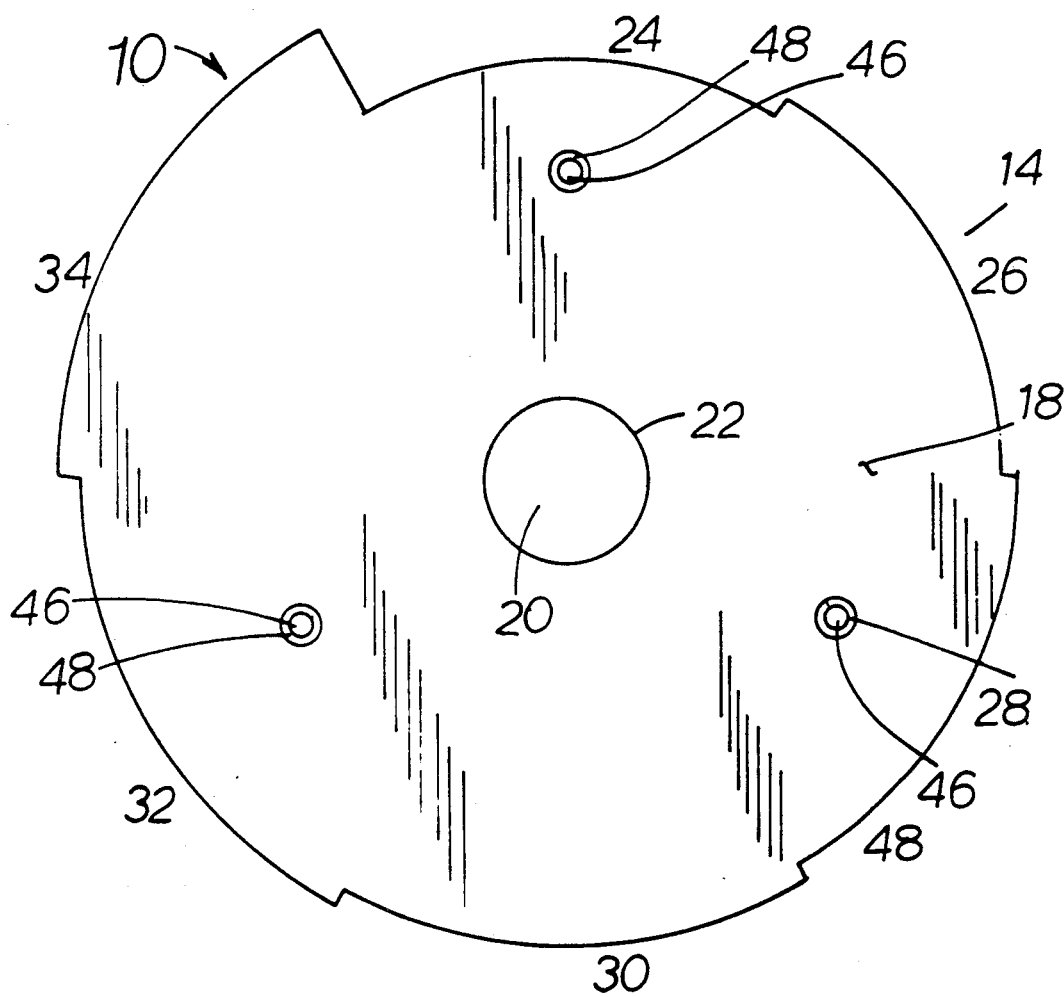
FIG. 11 is a bottom view of the embodiment of the router base showing the mounting holes.
Figure 15:
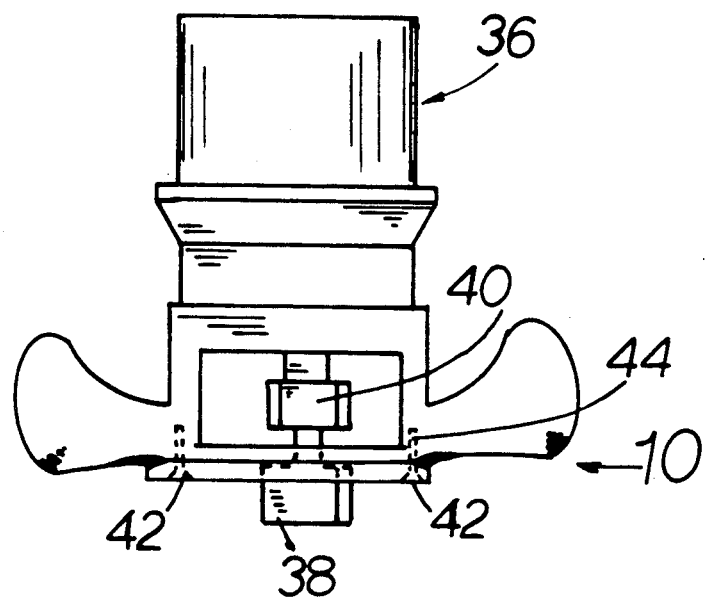
FIG. 15 is a side view of a router with the router base attached.

The router base 10 in the preferred embodiment must have mounting holes 46 drilled through the base 10. As illustrated in FIG. 10 and 11, no mounting holes are originally provided in this embodiment.

This feature provides for a universal fit to virtually all makes and manufactures of routers. The mounting holes 46 must be drilled through the router base 10. The mounting holes 46 must have a tapered opening 48 in bottom 18 to allow countersinking the mounting screws 42. The mounting screws 42 must be countersunk to provide a smooth bottom 18 so that the material into which the dado, rabbet or groove is being cut is not scratched, marred or damaged by the mounting screws 42 when making a cut.

Figures 13, 14:
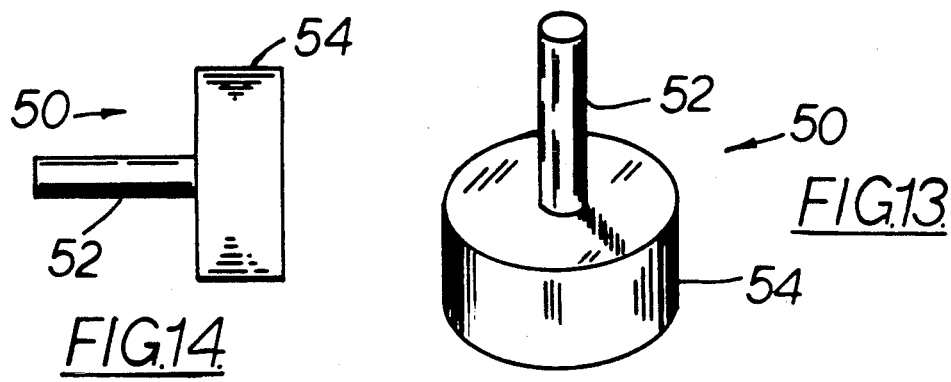
FIG. 13 is an isometric of the centering guide.
FIG. 14 is a side view of the centering guide.

A centering guide 50, FIG. 13 and 14, is provided in the preferred embodiment of this invention. The centering guide 50 is used to position the router base 10 so that the base 10 can be properly marked for drilling mounting holes 46. The centering guide 50 is similar to a router bit 38 but has no cutting edge. The centering guide 50 consists of a shank 52 and body 54. The shank 52 is of a standard diameter of router bits, which is 0.25 inches. The shank 52 is sized for insertion into a standard size chuck 40 of the router 36.

The body 54 of centering guide 50 is cylindrically shaped and attaches to the shank 52 about an axial centerline. The diameter of body 54 is equal to the inside diameter of the center opening 22 in router base 10.

The centering guide 50 is installed in the chuck 40 on the router 36 as would a normal bit. The router 36 is inverted and the mounting screws 42 are removed from the original base but the base is left in position. Now the router base 10 of this invention is put on the router so that it is lying on the original base.

The centering guide 50 is the same diameter as the center opening 22 in the router base 10. This assures that no matter what rotation or position the router base 10 is in, the radius of each and every segment are the prescribed distance from the center of the chuck 40 and consequently, from the center of any router bit subsequently installed.

Two clamps, or similar type devices, are applied to hold the original base to the router base 10. This assembly is then removed from the router. The old base now serves as an exact, individualized template for custom drilling mounting holes 46 in router bases 10.

After drilling, the clamps are removed and the mounting screws 42, previously removed are used to mount the router base 10 to the router 36. The centering guide 50 is removed, a ¼ inch straight cut router bit or any other desired bit is install and the router is set for operation.

The router base 10 is typically made from a rigid plastic material of approximately 0.25 inches thick, in the preferred embodiment. However, the router base could be constructed from any other suitable material without departing from the inventive concept revealed by the invention.

A second embodiment, consists of a disk shaped router base 10 having an outer perimeter 14, top 16, bottom 18, center 20 and center opening 22 as in the first embodiment described. The router base 10 has segments 24-34 as described above, which makes the outer perimeter identical to the first embodiment described above.

The second embodiment differs in that it has mounting holes 60 pre-drilled, and contains router receiving recessions 70 and 72. The second embodiment also has no centering guide since the mounting holes 62 are pre-drilled.

Most makes and models of routers on the market today have bottom diameters of either 5.25 inches or 6 inches and utilize a common mounting screw pattern having a radius of 4.21 inches. Thus, this second embodiment utilizes these features to present a router base 10 which is fit specifically to those routers.

The router base 10 typically has three pre-drilled mounting holes 60. These mounting holes 60 are located on a radius of 4.21 inches from the exact center 20 of the center opening 74 and 120 degrees apart from each other. The mounting holes 60 have a tapered region 62 on bottom 18 to allow for counter sinking the mounting screws 42.

The two router receiving recessions 70 and 72 are located in the top 16 of the router base 10. These recessions are sized to accommodate the bottom diameter of the router 38. Thus, the diameters of the recessions are 5.25 and 6 inches. The radii of these recessions are measured from the exact center 20 on the axial center line.

Figure 3:
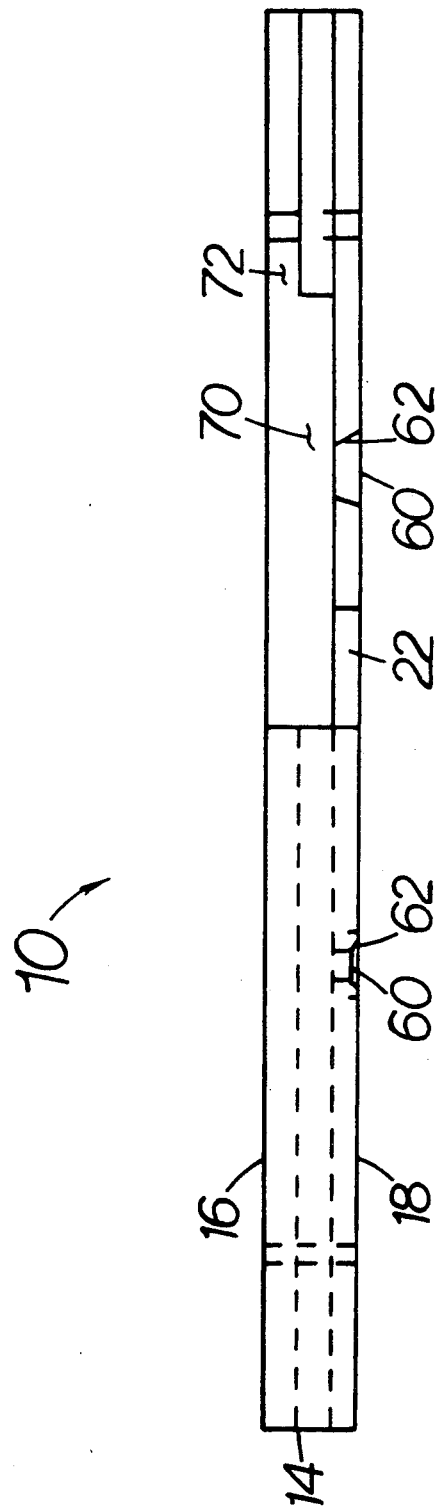
FIG. 3 is a sectional view of the side of an embodiment.

The thickness of the router base 10 in this embodiment is typically 0.5 inches and each of the recessions are successively 0.1875 inches in depth, measured from the top 16 of the router base 10. This can be seen on FIG. 3.

The router base 10 can be constructed as a single piece of material or can be made in layers. The first layer being the bottom, the second layer being a ring defining the router receiving recession 70 and a third layer defining the router receiving pocket 72. Typically, the router base 10 is made from a rigid plastic material. However, any other suitable material can be used.

In the second embodiment, the router base 10 is installed by inverting the router 38, removing the three mounting screws 42, removing the original base, positioning the router base 10 in place of the original base and mounting the router base 10 using the three mounting screws 42.

In operation, once the router base 10 is installed, the router can be used to cut dados, rabbets, grooves or the like, in standard widths which may be wider than the width of the router bit. This is accomplished by making successive cuts using the router base's segments 24-34 as a guide and a fence 70. This is illustrated by representation in FIGS. 4-9.

Figure 4:
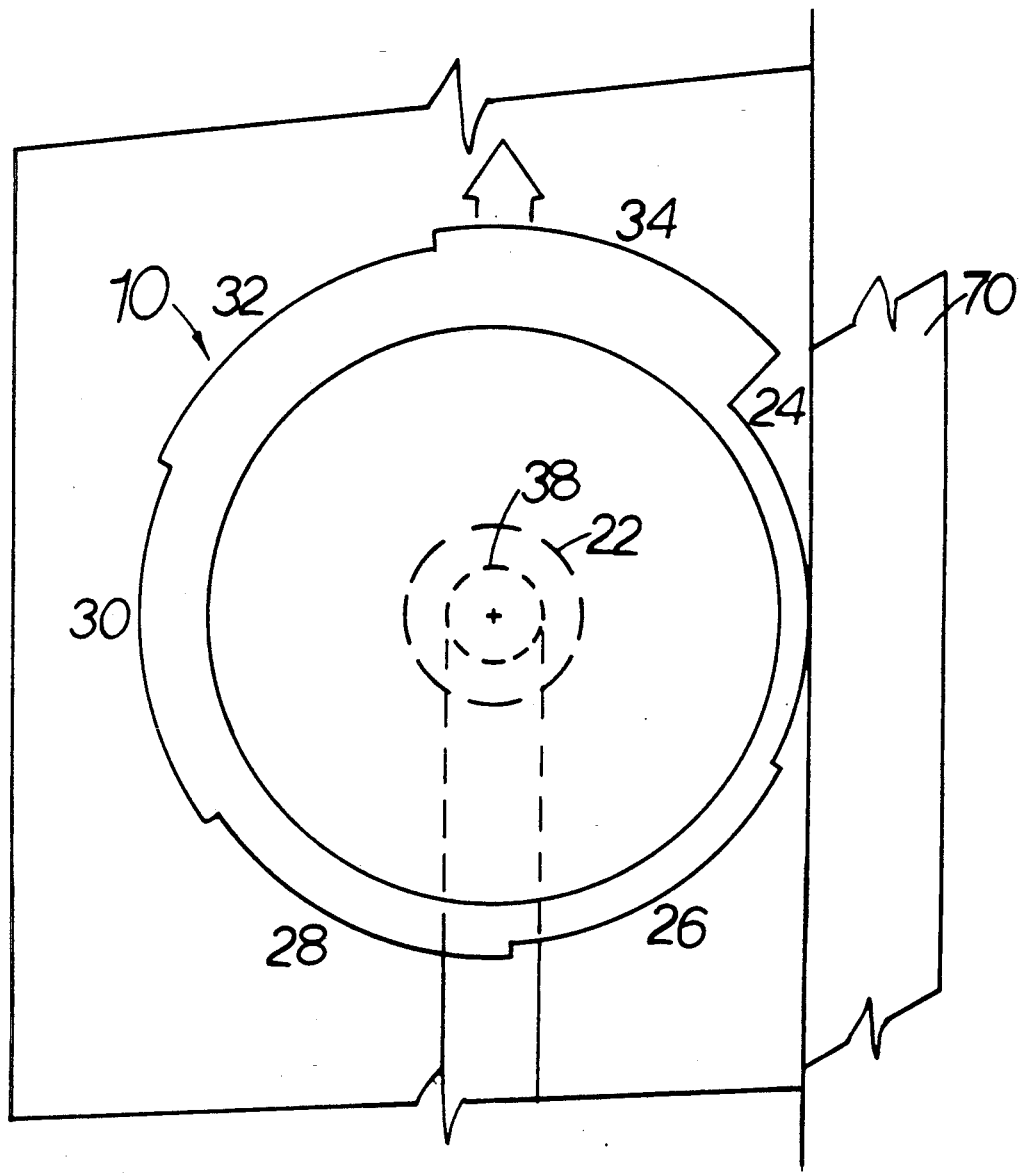
FIG. 4 is a representation of the router base in use showing a segment being used as a guide.
Figure 5:
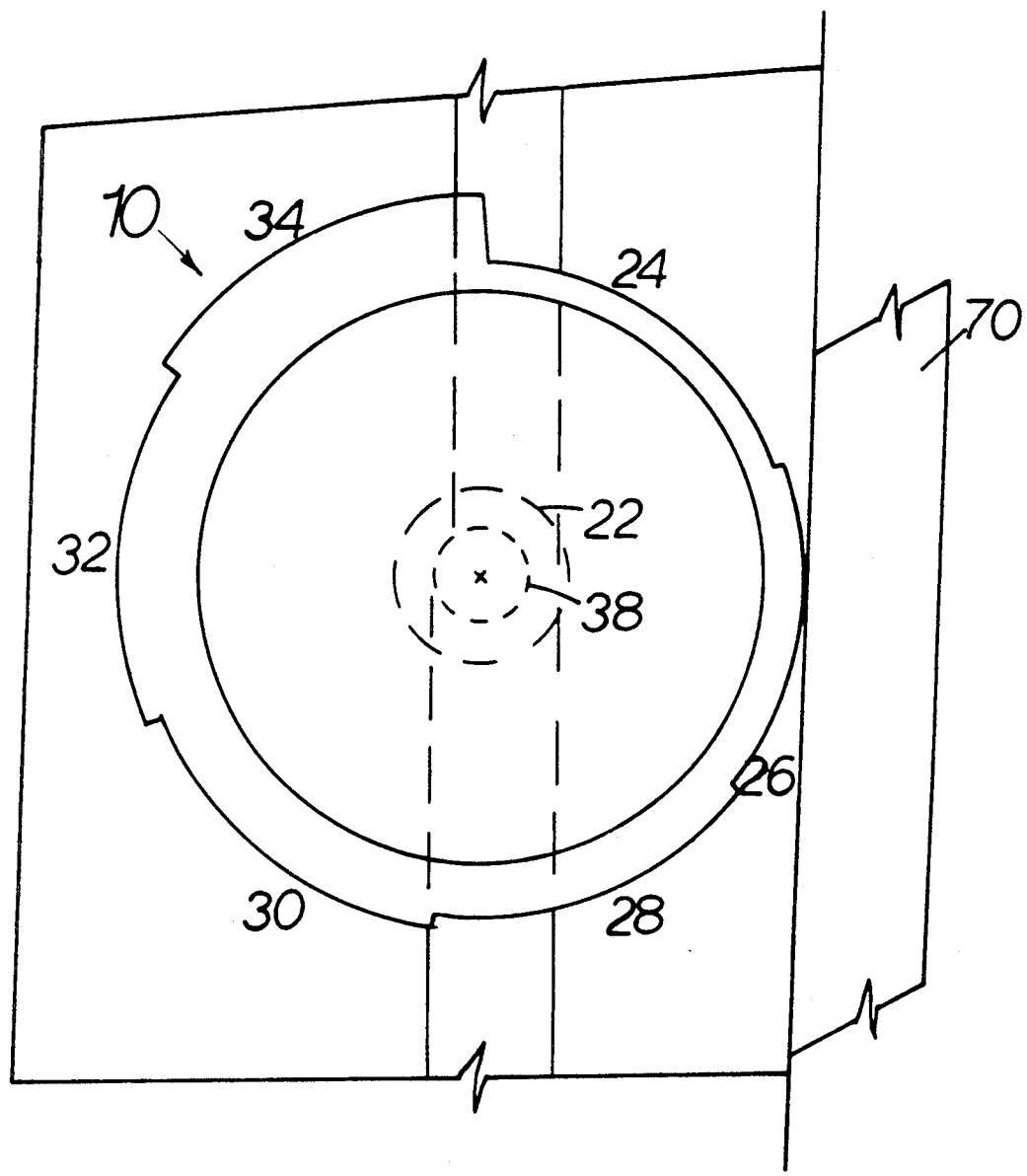
FIG. 5 is a representation of the router base showing another segment being used as a guide.
Figure 6:
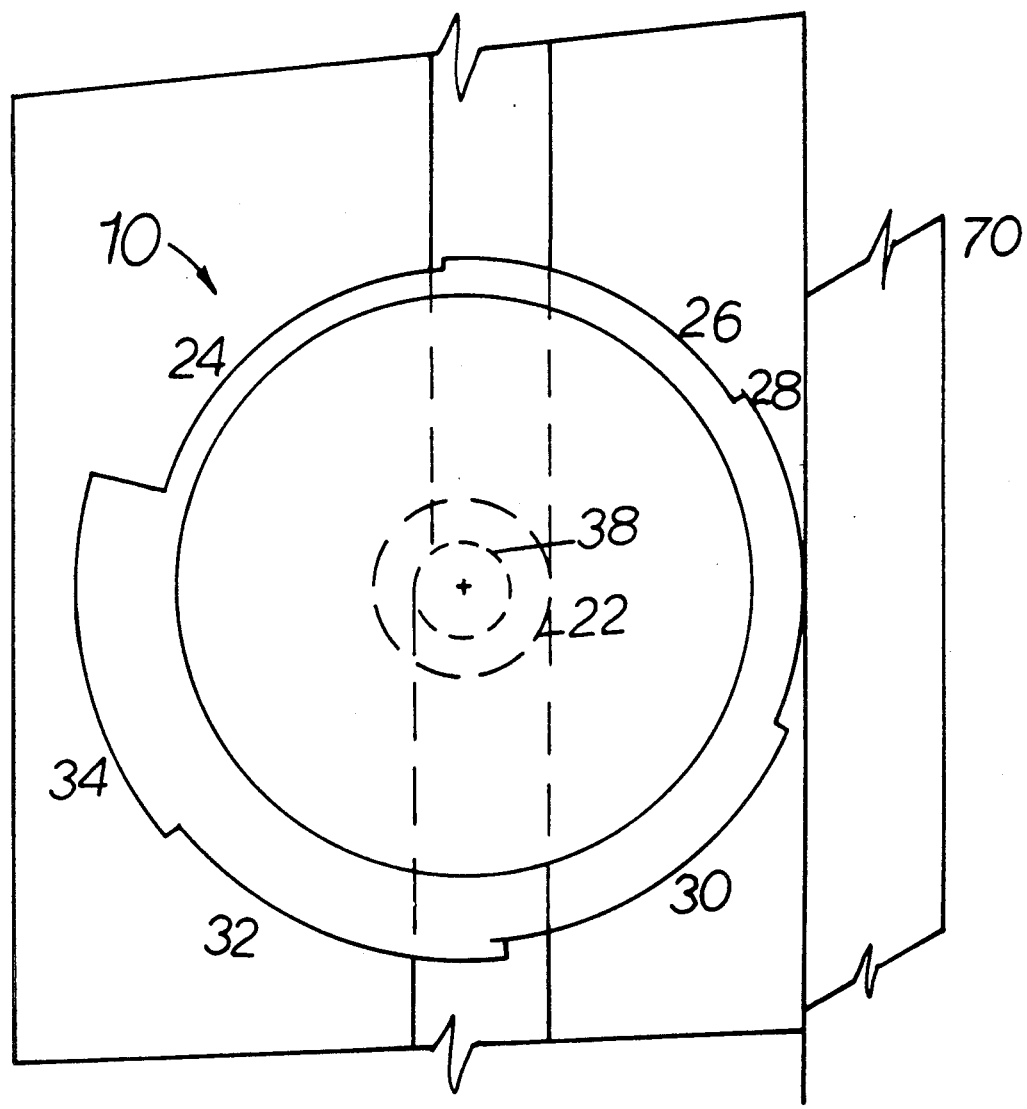
FIG. 6 is a representation of the router base showing another segment being used as a guide.
Figure 7:
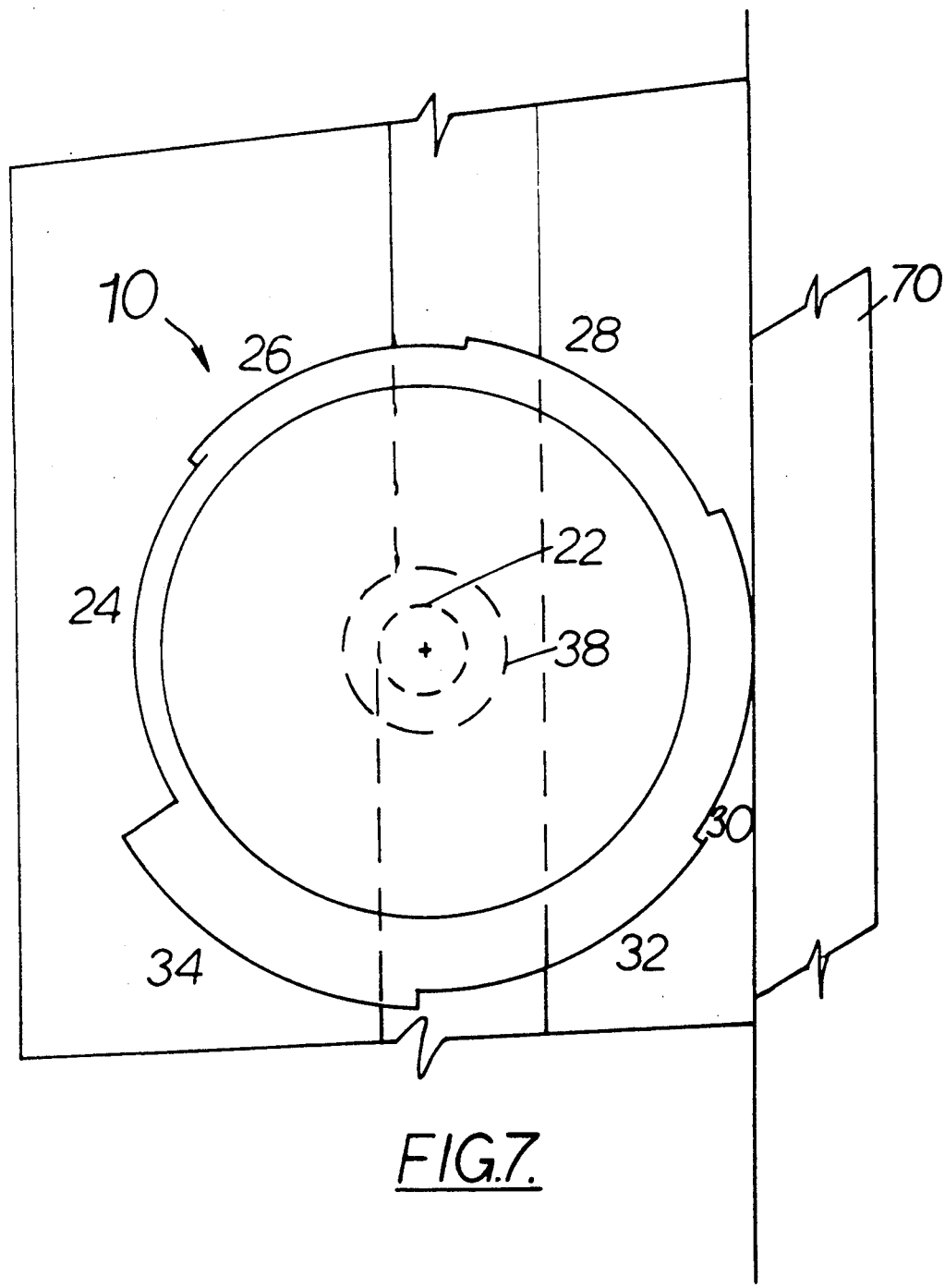
FIG. 7 is a representation of the router base showing another segment being used as a guide.
Figure 8:
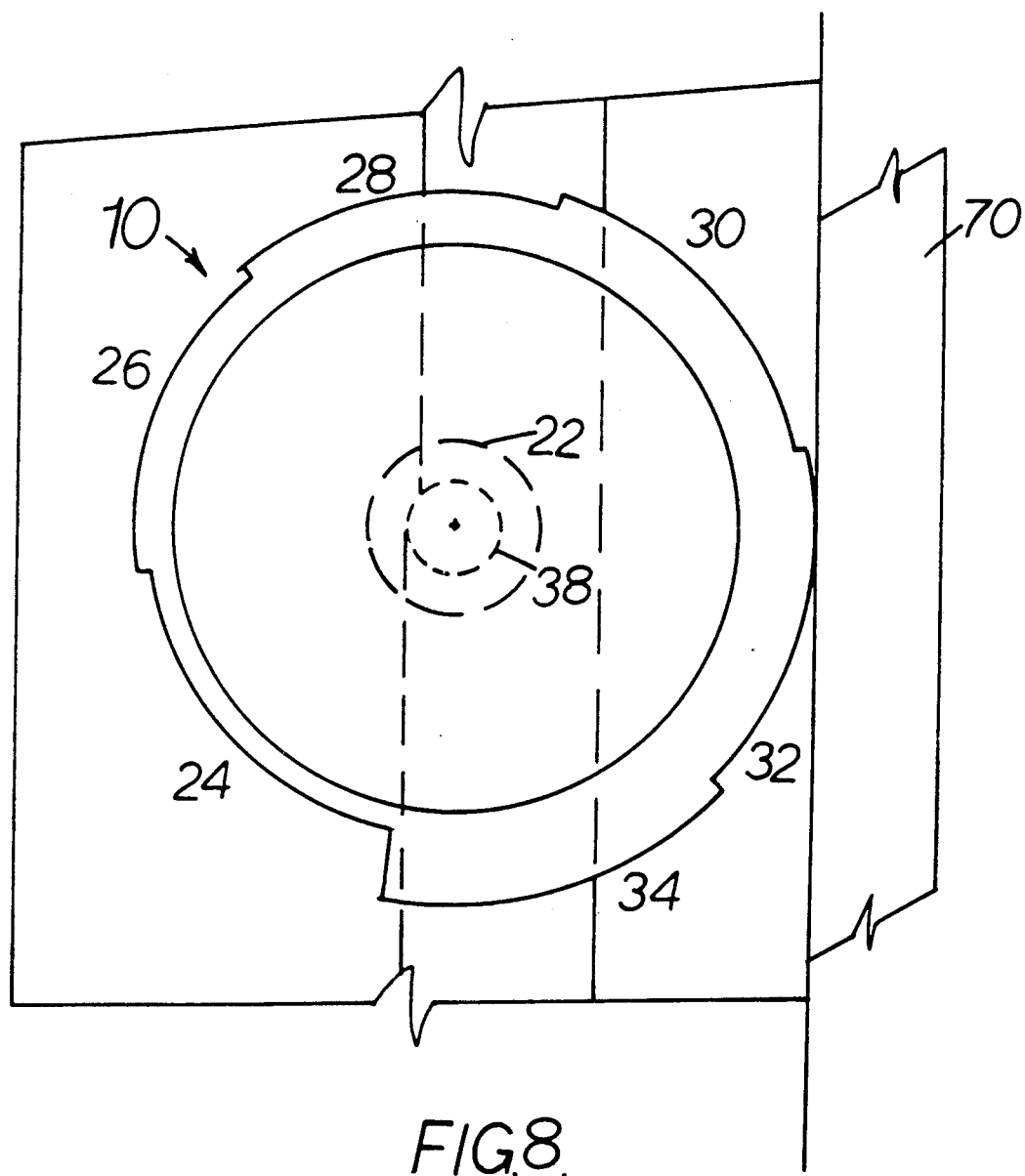
FIG. 8 is a representation of the router base showing another segment being used as a guide.
Figure 9:
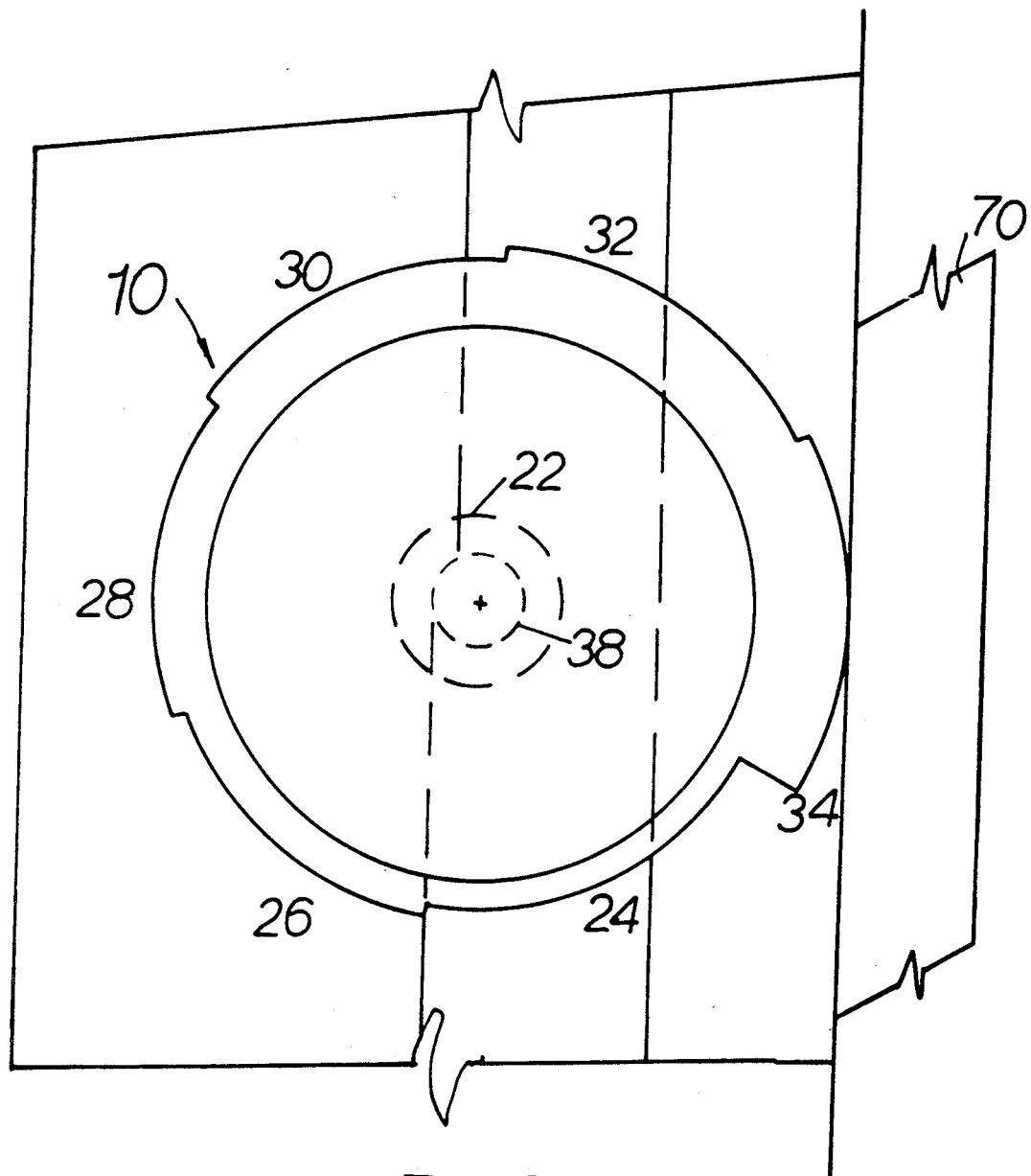
FIG. 9 is a representation of the router base showing the longest radius segment being used as a guide.

For example using the embodiments described herein, using a ¼ inch straight cut router bit, a fence 70 is positioned and secured parallel to the desired dado, rabbet, groove or the like at a distance of 3 inches from the inside edge of the dado, rabbet, groove or the like, to be cut. Running the router along the fence 70 using the segment 24 having the smallest radius (3.25 inches) creates a ¼ inch groove, rabbet, or dado with an inside edge 3 inches from the fence and the outside edge 3.5 inches, as represented in FIG. 4.

The width of the cut can then be increased by making a successive cut using the next segment with the larger radius. If successive cuts were made using the segments consecutively, the width of the dado, rabbet, groove or the like, would be increased in ⅛ inch increments with each cut. This is represented in FIGS. 5-9. Thus, dados, rabbets grooves and the like can be created having widths of ¼, ⅜, ½, ⅝, 1 and 1-⅛ inch without moving the fence.

From the foregoing description those skilled in the art will appreciate that all the objectives of the present invention are realized. A router base 10 which can be used as a guide to make dados, rabbets, grooves or the like has been provided.

While specific embodiments have been shown and described, many variation are possible. The particular design and style of the router base may vary without departing from the spirit of this invention. The particular number of segments and their shapes may vary, be changed or altered to suit a particular application, design or router without departing from the inventive concepts comprehended by this invention.

While arcuate segments are disclosed, it will now be understood that the present invention includes other geometric shapes arranged in accordance with the foregoing description and its equivalents.

Having described the invention in detail, those skilled in the art will appreciate that modifications may be made to the invention without departing from its spirit. Therefore. it is not intended that the scope of the invention be limited to the specific embodiments illustrated and described. Rather, it is intended that the scope of this invention be determined by the appended claims and their equivalents.

What is claimed is:

1. A router base, for use as a guide in making dados, rabbet grooves or an equivalent cut made with a conventional router tool, which comprises:

a base having a top, bottom, outer perimeter, center and center opening, the center corresponding to an axial center line of the rotation of a router bit installed on the router on which the base is attached;

a plurality of generally curved segments, the plurality of generally curved segments defining the outer perimeter of the base, each of the generally curved segments having a distinct and fixed distance from the center; and an attachment means to attach the base to the router.

2. A router base as set forth in claim 1 in which the segment are arcuate having a fixed radius from the center.

3. A router base as set forth in claim 2 in which the segments are arranged by radius in sequential order.

4. A router base as set forth in claim 3 in which the segments sequence is in ⅛ inch increments.

5. A router base as set forth in claim 1 in which the outer perimeter consists of six segments.

6. A router base as set forth in claim 1 in which the attachment means consists of mounting holes bored through the base, and mounting screws, the mounting holes corresponding to original mounting threaded bores contained on the router, the mounting holes having a tapered opening such that the mounting screws can be countersunk into the bottom of the base.

7. A router base as set forth in claim 1 in which the attachment mean comprises a means for providing mounting holes by which the base may be attached to the router by mounting screws, the mean consisting of a centering guide to properly position the base for custom drilling the mounting holes.

8. A router base as set forth in claim 1 in which the base further comprises at least one recessed area for receiving the router in the top of the base.

9. A router and router base, for use as a guide in making dados, rabbets, grooves or an equivalent cut made with a conventional router tool, which comprises:
- a base having a top, bottom, outer perimeter, center and center opening, the center corresponding to an axial center line of the rotation of a router bit installed on the router on which the base is attached;
- a plurality of fixed radius arcuate segments along the outer perimeter on the base, each the segment having a distinct and fixed radius from the center, the segments arrange by radius in sequential order about the perimeter of the base; and
- an attachment means to attach the base to the router.

10. A router base as set forth in claim 9 in which the outer perimeter consists of six segments.

11. A router base as set forth in claim 9 in which the segments have radii in ⅛ inch increments.

12. A router base as set forth in claim 9 in which the attachment means consists of mounting holes bored through the base, and mounting screws, the mounting holes corresponding to original mounting threaded bores contained on the router, the mounting holes having a tapered opening such that the mounting screws can be countersunk into the bottom of the base.

13. A router base as set forth in claim 9 in which the attachment mean comprises a means for providing mounting holes by which the base may be attached tot he router by mounting screws, the mean consisting of a centering guide to properly position the base for custom drilling the mounting holes.

14. A method of making dados, rabbets, grooves, parallel cuts or an equivalent cut made with a conventional router tool, which comprises the steps of;
- positioning and securing a fence at a fixed distance from the desired location of a dado, rabbet, groove or the like;
- cutting a first dado, rabbet, groove or the like by using the fence as a straight edge and running a router along the fence using a first segment of a segmented base attached to a router;
- rotating the router to place another base segment adjacent the fence; and
- making repeated cuts using successive segments of the segmented base attached to the router, without repositioning the fence.

* * * * *